M. BECK.
MACHINE FOR GATHERING AND HANDLING HAY.
APPLICATION FILED JUNE 1, 1909.

1,142,927.

Patented June 15, 1915.
5 SHEETS—SHEET 1.

Witnesses
B. G. Brown
S. Jay Teller

Inventor
Marshall Beck
H. H. Bliss
Attorney

M. BECK.
MACHINE FOR GATHERING AND HANDLING HAY.
APPLICATION FILED JUNE 1, 1909.

1,142,927.

Patented June 15, 1915.
5 SHEETS—SHEET 5.

Witnesses
B. G. Braun
S. Jay Teller

Inventor
Marshall Beck
By H. H. Bliss
Attorney

UNITED STATES PATENT OFFICE.

MARSHALL BECK, OF MOLINE, ILLINOIS, ASSIGNOR OF ONE-THIRD TO DAVID K. HILL, OF CHICAGO, ILLINOIS, AND ONE-THIRD TO JULIA T. SKINKLE, OF KENOSHA, WISCONSIN.

MACHINE FOR GATHERING AND HANDLING HAY.

1,142,927.  Specification of Letters Patent.  Patented June 15, 1915.

Application filed June 1, 1909. Serial No. 499,863.

*To all whom it may concern:*

Be it known that I, MARSHALL BECK, a citizen of the United States, residing at Moline, in the county of Rock Island and State of Illinois, have invented certain new and useful Improvements in Machines for Gathering and Handling Hay, of which the following is a specification, reference being had therein to the accompanying drawing.

The invention relates especially to hay handling machines of the class in which each machine is adapted to pick up or gather the hay from the position in which it is left by the mower and to convey it laterally and deliver it in a windrow at one side. While the invention relates especially to a machine of this class it will be understood that certain of its features are equally applicable to machines of other classes, and such other machines when embodying my improvements are to be understood as coming within the scope of my invention.

The object of the invention is to provide a machine of this class having improved means for gathering the hay from the ground and improved means for lifting and conveying the hay.

Another object of the invention is to provide an improved general arrangement of the operative parts of the machine whereby it is adapted to be substantially balanced upon two ground wheels and to be easily guided and controlled by means of the tongue or tongues.

Other objects of the invention are to provide such improved details of construction and arrangement of parts as are described in the following specification.

Referring to the drawings, 1 represents the main frame of the machine and this comprises the two side bars 2, 2 and the forward cross bar 3. No rear cross bar is necessary, the cylinders and other parts of the machine which will be hereafter described furnishing sufficient connection between the rear parts of the side bars of the frame. The tongues 5, 5 are made rigid with the frame, being joined at their forward ends, and carry a neck yoke which is attached to the harness, and by means of which the forward ends of the tongues are supported. The draft whiffletrees are attached to the hooks 6.

7, 7 are the main supporting and driving wheels and 8 is the impaling cylinder. The mounting of the main frame and the impaling cylinder upon the supporting wheels will be best understood by a reference to Fig. 5.

Figure 5:
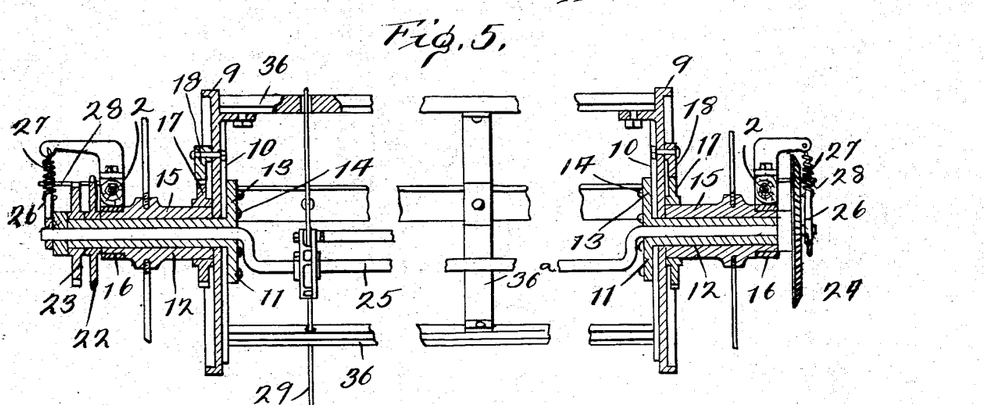
Fig. 5 is a cross sectional elevation longitudinally of the lower or impaling cylinder and shows the ratchet device in position.
Figure 6:
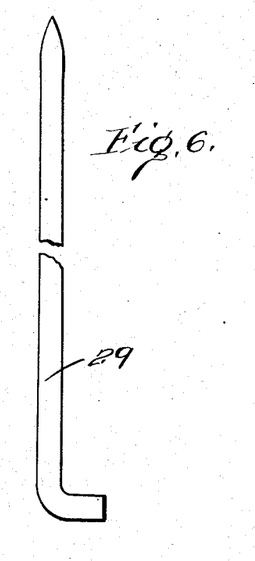
Fig. 6 is a detail view of one of the impaling fingers.
Figure 7:
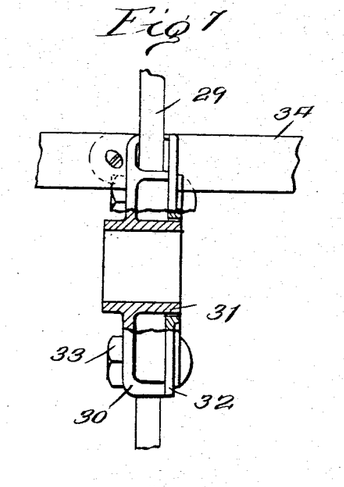
Fig. 7 is an enlarged view of one of the finger supporting disks, partly in cross section.
Figure 8:
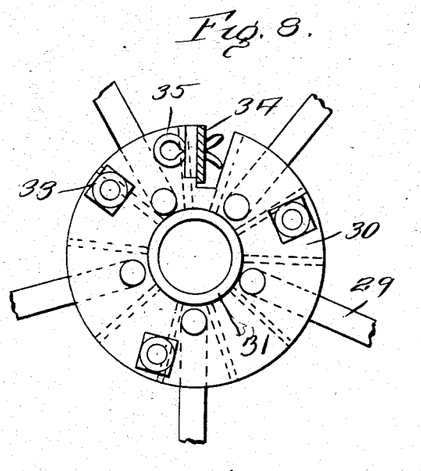
Fig. 8 is an elevation of one of the finger supporting disks and shows the fingers in position.

9, 9 are end plates of the impaling cylinder. The end plates are provided with radial bracing ribs 10, 10 and have circular apertures at their centers to receive the trunnion castings 11, 11. These trunnion castings comprise the hollow cylindrical portions 12, 12 and the flange portions 13, 13, which are secured to the inner sides of the end plates by means of the bolts 14, 14.

15, 15 are the hubs of the main driving wheels and are bored to turn freely upon the trunnion castings 11, 11. The outer ends of the hubs are extended and engage the bearing boxes 16, 16, in which they turn freely. The bearings 16, 16 are secured to the frame of the machine, and in this way the frame is directly supported upon the main wheels.

The inner end of each of the wheel hubs 15, 15 carries a ratchet wheel 17, which is rigidly mounted upon it.

18 is a pawl (shown in Fig. 9) pivotally mounted on one of the end plates, and is adapted to engage the ratchet wheel 17.

Figure 9:
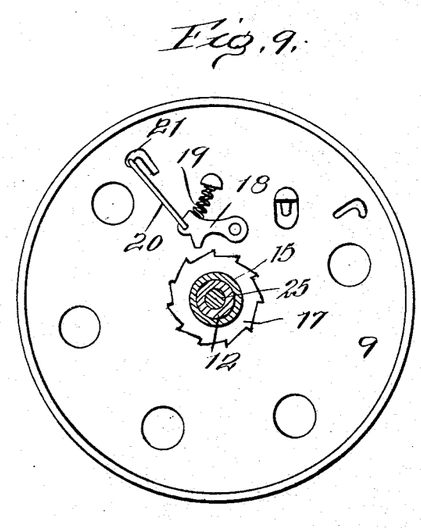
Fig. 9 is a view of one of the end plates.

19 is a compression spring adapted to hold the pawl in engagement with the wheel.

20 is a rod pivotally connected at one end to the outer end of the pawl. The other end of the rod is bent inward and passes through the L-shaped slot 21 in the end plate. As shown in Fig. 9, the hooked end of the rod is in engagement with the circumferential portion of the L-shaped slot, and the pawl is thus held out of engagement with the ratchet wheel. The action of the compression spring 19 serves to keep a constant tension in the rod 20, which is thus prevented from working out of its position in the slot 21. When it is desired to permit the pawl to engage the ratchet wheel, the hooked end of the rod 20 is transferred to the radial portion of the slot 21, thus allowing the pawl to engage the wheel. As the pawl rises and falls over the teeth of the wheel, the rod 20 will slide freely in the slot. A ratchet device, such as I have described, is used at each end of the cylinder. The driving wheels are thus permitted to rotate independently of each other, and the wheel which is rotating in a forward direction the more rapidly serves to drive the cylinder.

The portions 12, 12 of the trunnion castings 11, 11 extend outward beyond the ends of the hubs 15, 15. The trunnion casting on the left hand side of the machine has rigidly secured upon it the sprocket wheel 22 and the gear wheel 23 which serve to drive other parts of the machine, as will be more fully described hereafter. The trunnion casting at the right hand of the machine carries the bevel gear wheel 24, which drives the transverse conveyer in a manner to be fully described hereafter.

The center cranked rod 25 passes at its ends through the hollow trunnion castings 11, 11. Each end of this rod has mounted upon it a cross bar 26, which extends, preferably, in the same plane with the cranked portion of the rod 25. The cross bars 26 extend in both directions from the rod, and to the forward end of each of the cross-bars is attached a spring 27, which is supported at its other end upon a suitable bracket mounted upon the frame of the machine. The forward parts of the cross-bars are extended beyond the points of connection of the springs and are engaged by the pins 28, which extend outward from the frame of the machine. These pins, or stops, serve to limit the rotary movement of the cross-bars and of the cranked rod and are preferably so located that the cranked portion of the rod will be held normally in a position at an angle of about 45° downward and backward from the axis of the cylinder. The action of the springs 27 tends to hold the cross-bars in position against the pins 28.

Referring to Figs. 6, 7 and 8, 29—29 are pins or fingers each formed preferably of a steel rod of circular cross section and bent at one end to pass through holes in the disks 30. The disks 30 are each provided with a hub 31 which is bored to turn freely on the rod 25. This hub is extended to pass through a suitable aperture in a disk 32. The disks 30 and 32 are secured together by means of bolts 33. Each disk 30 is provided with a series of radial flanges arranged in pairs at the sides of the apertures through which the fingers or pins pass. These radial flanges serve to limit the swinging movement of the pins relative to the disk. The pairs of disks 30 and 32 are spaced at regular intervals along the cranked portion of the rod 25 which serves as a support for them and for the fingers and are maintained in proper position by means of the spacing rod 34, which passes through notches in the disks and is secured to them by means of the cotter pins 35, which pass through bosses on the disks 30. This spacing rod 34 serves not only to prevent the sidewise movement of the disks but also serves to hold all of the disks in the same angular position.

36—36 are connecting bars extending between the end plates 9 of the cylinder 8. These are bolted at their ends to the end plates. Between the end plates I prefer to provide one or more braces for the bars 36, which may take the form of a polygonally bent bar 36ª, to each face of which is bolted one of the bars 36. The bars 36 are provided with a series of holes, through which the fingers 29—29 extend.

Figure 10:
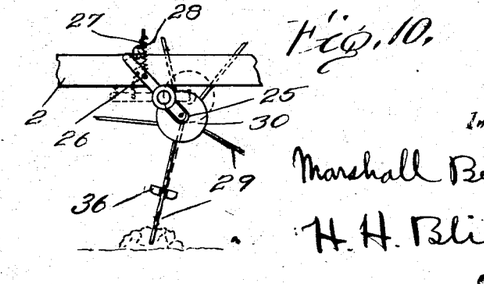
Fig. 10 is a cross sectional view of the lower cylinder and shows the action of the fingers in passing over an obstacle.

As previously described, the cranked shaft 25 is held normally in position at an angle of about 45° downward and backward from the axis of the cylinder. The rotation of the end plates and of connecting bars 36 cause the pins to rotate and also the disks 30 and 32. On account of the eccentric position of the shaft 25, the pins when in line with it will extend perpendicularly outward from the connecting bars, and as they pass upward and forward, the pins will be inclined forward and will be, at the same time gradually withdrawn until at a point opposite the cranked portion of the rod 25 they will be almost entirely within the connecting bars. From this point onward they will be gradually pushed out until they again reach the point of maximum extension. The elastic mounting of the cranked rod 25, by means of the springs 27, permits the rod to be turned backward when the pins engage rocks or other obstructions on the ground. As soon as the obstruction has been passed, the springs again return the rod to its normal operative position. The springs 27 must have sufficient force to cause the fingers to impale the hay and, at the same time, not be too strong to permit the fingers to overcome its tension when they engage a stone or other obstacle. I have found, in practice, that a comparatively light spring is sufficient to cause the fingers to operate properly. The stops or pins 28 prevent the shaft from working to a lower position where the fingers could not operate to lift it when an obstruction is met with. When the machine is not in operation, it is desirable that the fingers should extend upward rather than downward. This is brought about by unhooking the springs 27 from their normal position in the cross-bars 26 and hooking them into the holes 26$^a$ at the other ends of the cross-bars. In this way the cranked portion of the rod 25 will be held in vertical position, and the point of maximum extension of the pins will be at the top of the cylinder.

When the machine is not in use and is being transported from place to place not only can the parts be adjusted as above described to bring the point of maximum extension of the fingers at the top, but also the impaling cylinder and the other operative parts can be thrown entirely out of operation.

37 is the elevating cylinder, mounted in bearings upon the brackets 38. This elevating cylinder is similar in many respects to the impaling cylinder. It comprises end plates 39, 39, trunnions connected to the end plates and passing outward through the bearings, and connecting bars 40—40. The trunnion at the left hand end of the cylinder carries the sprocket wheel 41. The chain 42 passes over the sprocket wheel 41 and the sprocket wheel 22, and in this way drives the elevating cylinder.

43 is a cranked rod passing through the trunnions of the elevating cylinder, rigidly held at its ends by means of the brackets 44.

Fingers 45 are mounted on the cranked shaft 43 in a manner similar to that of the fingers 29 upon the cranked shaft 25. These extend through holes in the connecting bars 40 and operate in much the same manner as the fingers 29. It is, of course, unnecessary, in this case, to provide an elastic mounting for the cranked shaft, as no obstructions can be encountered by the fingers. I also find it unnecessary to use a spacing bar between the pairs of disks. Each of the fingers will extend a greater proportionate distance through one of the connecting bars in each revolution, and it is, therefore, impossible for the disks to become displaced on the shaft, and, furthermore, there can be no side pressure on the pins, such as might occur in the case of the pins of the impaling cylinder. In the upper or elevating cylinder, I do not find it necessary to employ as many successive rows of pins as it is desirable in the lower or impaling cylinder. The numbers which I prefer, and which are shown in the drawings are three rows in the upper cylinder and five rows in the lower cylinder.

46 represents as an entirety the longitudinal conveyer. This longitudinal conveyer comprises the chains 47, 47 which pass over suitable flanges formed on the end plates 39 of the upper cylinder and on a supplementary disk between the end plates and over the guide wheels 48, 48, which are suitably mounted on brackets 49, 49, extending from the brackets 38, 38 and the bar 38$^a$.

50—50 are cross-bars mounted on the chains 47, 47 and engage at their ends with suitable notches in the end plates 39, 39. In this way the motion of the cylinder is transmitted to the conveyer.

51 represents the main transverse conveyer and comprises the side chains 52, 52 passing over the sprocket wheels 53, 53, suitably mounted upon shafts 54, 54$^a$, which are in turn mounted upon bearings attached to the main frame. 55—55 are cross bars or flights connecting the chains 52, 52. The shaft 54$^a$ at the right hand side of the machine is connected, preferably, by a universal joint 56$^a$ with the transmission shaft 56, which is in turn connected to the shaft 57, which is preferably square.

58, 58$^a$ are bevel gear wheels mounted by means of their hubs in the brackets 59, 59 attached to the main frame. These gear wheels and hubs have central apertures sufficiently large to permit their journal sleeves mounted upon the square shaft 57 to turn freely therein.

Figure 1:
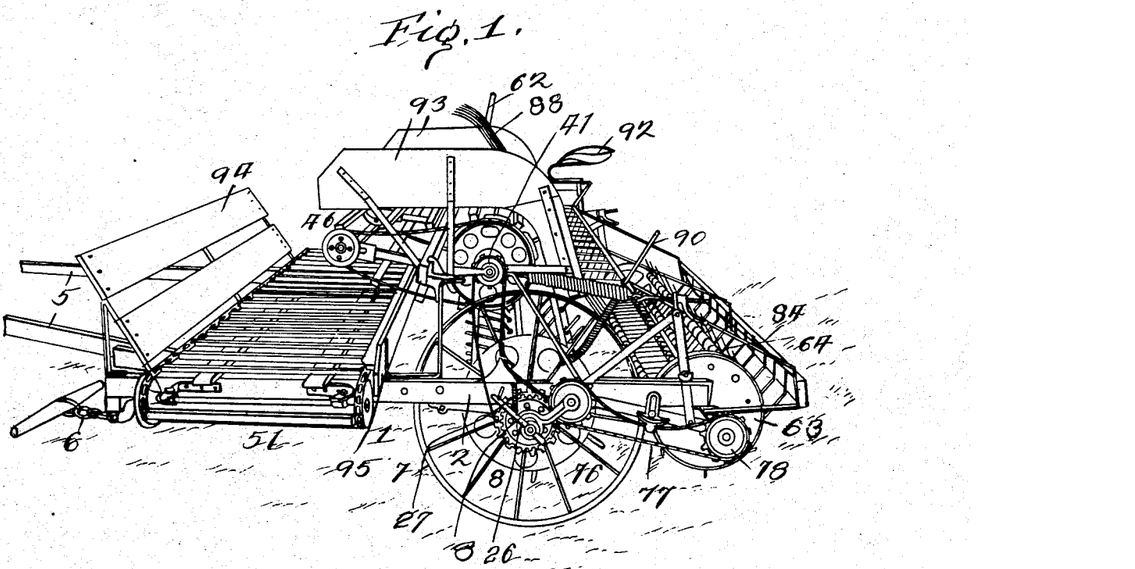
Figure 1 is a perspective view showing a machine embodying my invention.
Figure 2:
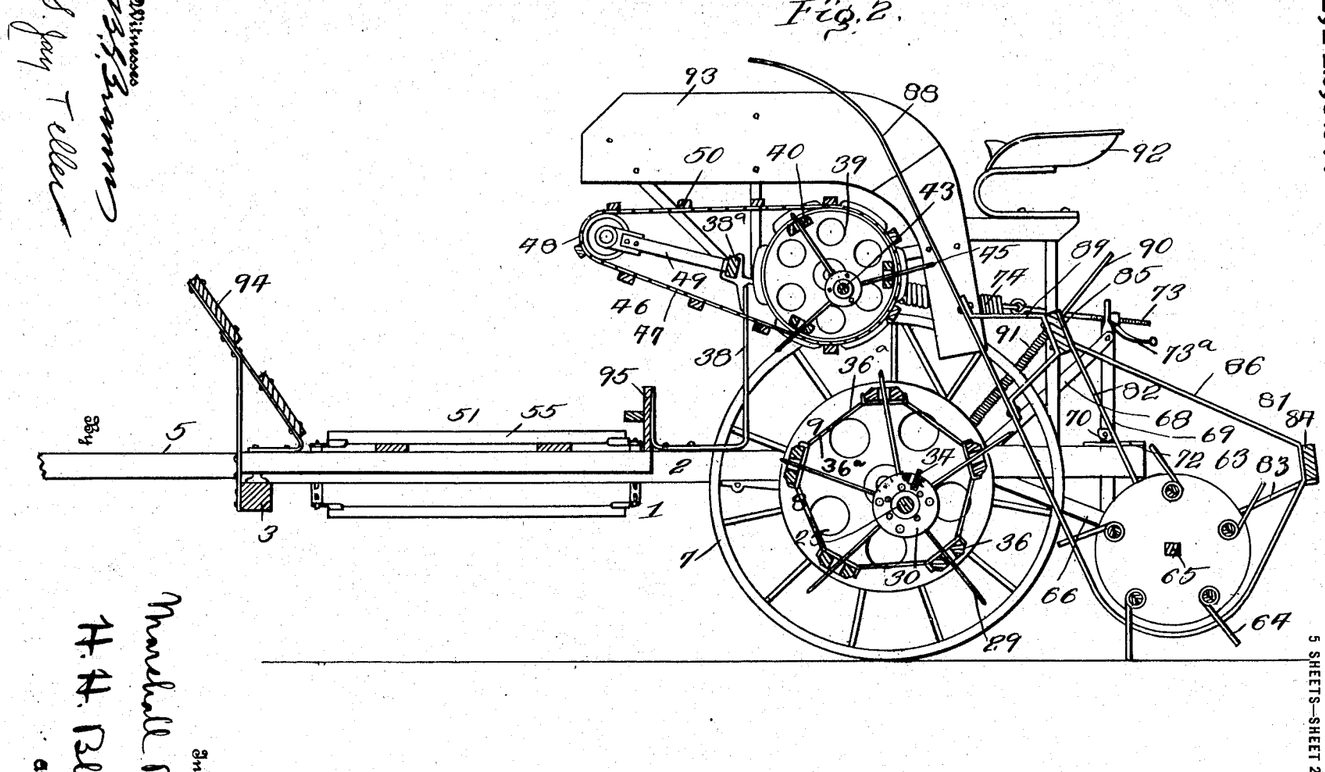
Fig. 2 is a cross sectional elevation through the center of my machine.
Figures 3, 11, 12:
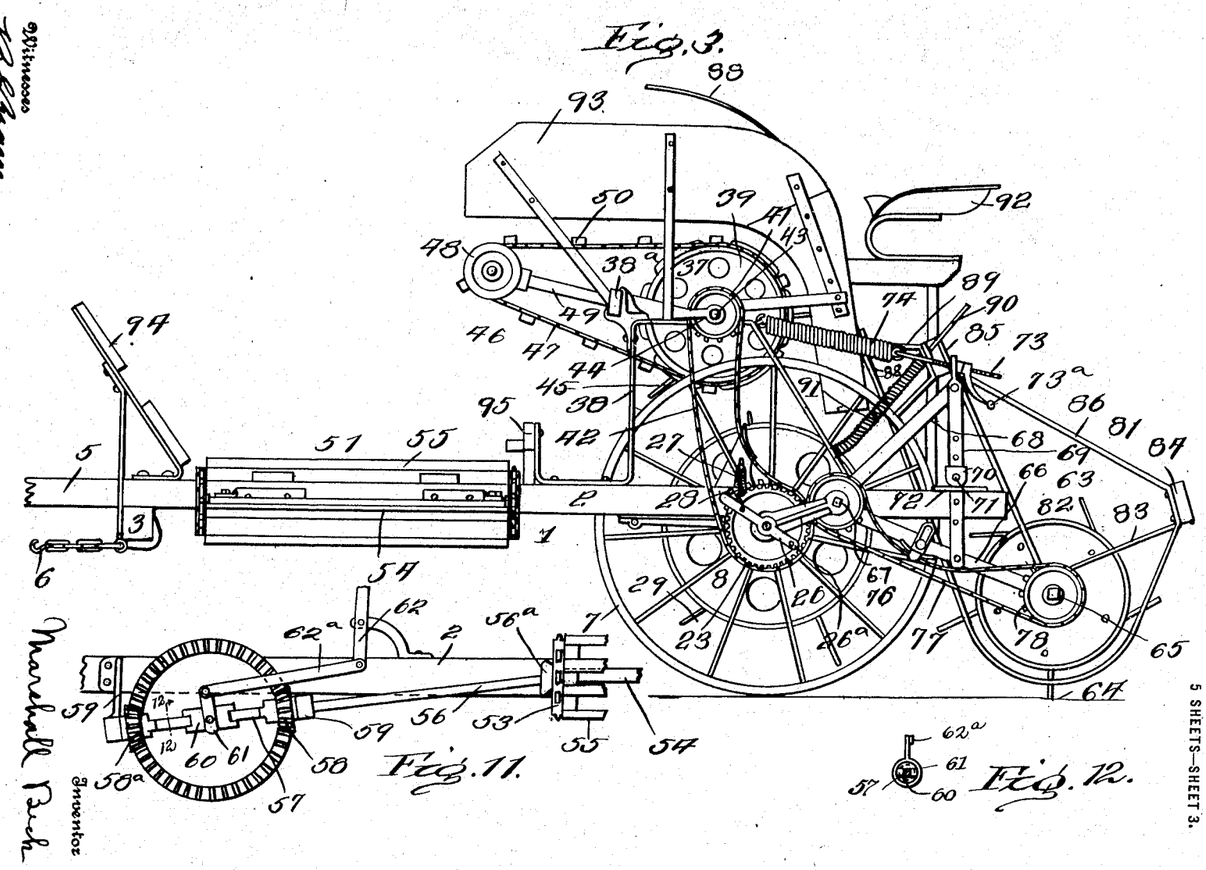
Fig. 3 is a side elevation.
Fig. 11 is a fragmentary end view showing the controlling and reversing mechanism for the cross conveyer.
Fig. 12 is a fragmentary cross sectional view taken on the line 12—12 of Fig. 11.
Figure 4:
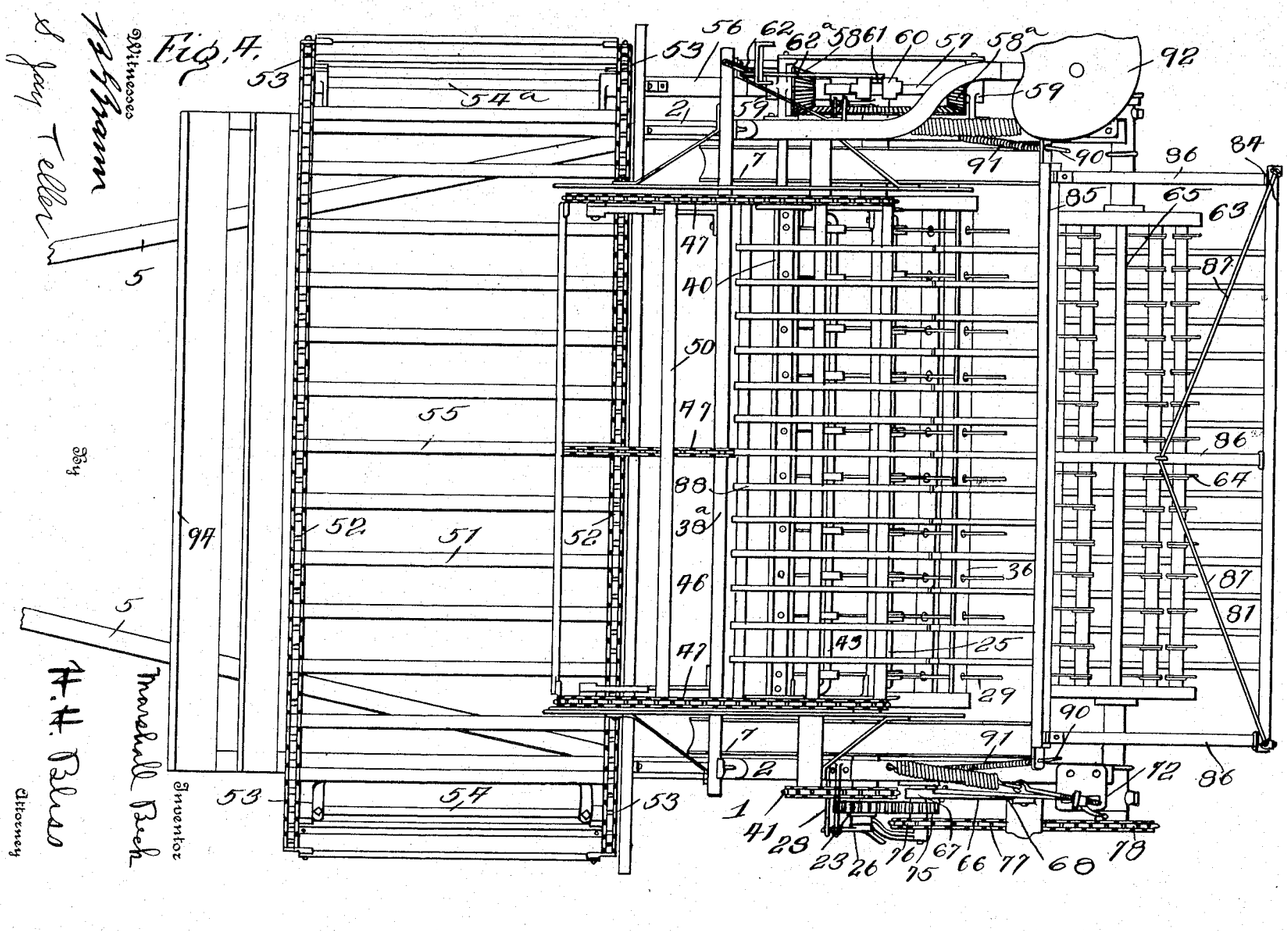
Fig. 4 is a plan view.

60 is a clutch piece, having a square aperture, which closely fits the shaft 57 but leaves the piece 60 free to slide. The piece 60 is provided with a circumferential groove, which is engaged by the ring 61. The ring 61 is connected to a lever 62 within reach of the operator by means of the rod 62$^a$. By throwing this lever in one direction or the other, the notches on piece 60 can be brought into engagement with the corresponding recess of either the gear wheel 58 or the gear wheel 58$^a$. In this way the shaft 57 may be rotated in either direction at the will of the operator, and the direction of motion of the conveyer 51 will be correspondingly changed. When the clutch piece 60 is in its central position the conveyer is idle and serves merely as a receiver for the hay discharged upon it.

63 represents the gathering cylinder. The construction which I prefer for this gathering cylinder is fully shown and described in my patent No. 682,449, issued September 10th, 1901, entitled Machine for gathering and handling hay, and a brief description here will therefore be sufficient.

64, 64 are a series of fingers spaced at regular intervals lengthwise of the cylinder and are spring mounted so that they may bend back without injury. They are so mounted on the cylinder that their position will be changed during rotation. At the lower position the fingers will lie in a substantially radial position. As the fingers rotate with the cylinder, they will be gradually inclined backward on the direction of rotation until the uppermost point is reached. From this point onward to the lower position, the fingers will again gradually resume their radial position. The cylinder 63 is mounted on the shaft 65, which is in turn supported by bearings on the bracket bars 66, 66. The bracket bars 66, 66 are pivotally mounted at their forward ends on the main frame at 67. The bars 68 are also pivotally mounted on the frame at 67, being preferably rigidly connected to the bars 66, 66, and the vertical bars 69, 69 connect the upper ends of the bars 68, 68 with the bars 66, 66 at points between their ends.

70, 70 are limit stops adjustably mounted on the bars 69, 69, by means of the pins 71, 71. The bars 69, 69 pass through slotted brackets 72 on the main frame, and the engagement of the stops 70, 70 with the brackets 72 limits the downward movement of the cylinder 63 and its supporting frame about the pivotal axis 67. The vertical bars 69, 69 are provided with eyes through which pass the threaded rods 73, 73. These rods are connected at their forward ends to springs 74, which are, in turn, connected to the brackets 38, 38. Nuts 73ª, 73ª on the threaded rods 73, 73 provide a means for adjusting the tension of the springs 74, 74. In this way an adjustable elastic mounting for the cylinder 63 is provided. The springs 74, 74 tend at all times to elevate the cylinder and it will, therefore, ride over obstructions readily. The limit stops 70, 70 prevent the cylinder and the supporting frame from vibrating so vertically that the teeth might engage the ground and be injured. The pivotal mounting of the frame bars 66, 66 and 68, 68 at 67 are preferably outward extending pins.

On the pin at the left hand side of the machine is provided the gear wheel 75, which meshes with the gear wheel 23 on the trunnion 11.

76 is a sprocket wheel mounted on the same pin and connected to the gear wheel 75. The chain 77 passes over the sprocket wheel 76 and the sprocket wheel 78 on the cylinder axle 65. In this way, power is transmitted from the main drive wheel through the gear wheels 23 and 75, the sprocket wheels 76 and 78 and the chain 77 to the cylinder 63. The mounting of the sprocket wheel 76 at the point of pivotal connection of the cylinder supporting frame permits the cylinder to swing up and down without in any way changing the tension in the chain.

81 represents as an entirety the guiding and compressing frame for the hay. This frame is pivotally mounted by means of suitable bearings attached to the bars 82, 82 and 83, 83 on the axle 65 of the gathering cylinder.

The bars 83, 83 carry at their rear ends the cross yoke 84, and the bars 82, 82 carry at their upper ends the cross yoke 85.

86—86 are connecting bars, preferably three in number, between the yokes 84 and 85.

87, 87 are bracing rods connecting the middle one of the bars 86 with the ends of the yoke 84. The bars 82, 83 and 86 at the sides of the machine are preferably formed of one piece and, together with the yokes 84, 85 form a rigid frame pivotally mounted on and free to swing about the shaft 65.

88, 88 are the flexible guiding and compression bars for the hay. The rear ends of these bars are rigidly secured at regular intervals to the yoke 84. From the yoke 84, the bars pass downward and are curved around the cylinder 63, preferably concentric with it. The bars then extend upward, preferably passing close to the cylinders 8 and 37.

The forward parts of the bars 88—88 are supported by means of the brackets 89—89 attached to the yoke 85. The weight of this guiding and compressing frame is so distributed that the tendency is for the forward end to swing downward. This tendency to swing downward is controlled by means of the rods 90, 90 and the compression springs 91, 91. The rods 90, 90, pass through suitable eyes attached to the yoke 85 and at their lower ends are pivotally mounted upon the main frame. The springs 91, 91 engage the brackets 38 at their lower ends and at their upper ends engage the eyes on the yoke 85. In this way, the guiding and compression frame is elastically mounted so that the bars 88 will tend to compress the hay against the cylinders 8 and 37, but will yield to accommodate themselves to the quantity of hay which is being handled.

92 represents the seat for the driver, which is suitably mounted on the main frame, preferably at the right hand side of the machine.

93, 93 are sheet metal guides to keep the hay from working sidewise out of proper engagement with the conveying devices. 94 and 95 are guides located at each side of the transverse conveyer to keep the hay in proper position.

The operation of the machine is as follows: As the machine is drawn forward by the horses, the sheet of hay on the ground is engaged by the forward stroke of the fingers 64 of the gathering cylinder, and is carried upward by the gathering fingers as they rise with the rotation of the cylinder. The axle cylinder 8 serves as an auxiliary to the gathering cylinder; the latter keeping the sheet of hay impaled on the fingers 29 in what may appropriately be called a "double pickup". The combined action of these two cylinders forces the hay into the space between the cylinder 8 and the compression bars 88. At this point, the fingers 64 of the cylinder 63 are inclined backward and are thus freely withdrawn from the hay, the bars 88 acting as strippers. The fingers 29 of the cylinder 8 are also withdrawn at a point somewhat above the point of withdrawal of the fingers 64. The fingers 45 of the cylinder 37 serve to disengage the hay from the cylinder 8. As they are moving in the opposite direction from the fingers 29 and as they are extended while the fingers 29 are withdrawn, they serve to keep the hay from passing between the two cylinders. When the hay has been engaged by the fingers of this elevating cylinder it is carried upward and forward until it is engaged by the conveyer 46, which serves to strip the hay from the elevating cylinder and to carry it forward to the transverse conveyer. When the hay has reached the transverse conveyer it is carried to one side or the other, according to the direction of motion of the conveyer and dumped on the ground in a continuous windrow.

As above stated, when the machine is to be transported from place to place, all of the moving parts may be thrown out of operation by disengaging the pawls 18 from the ratchet wheels 17. The fingers 29 may be elevated to prevent possible injury by unhooking the springs 27 from their normal position and attaching them to the cross bars 26 at 26ª. The gathering cylinder may also be elevated and held in its upper position by placing the stops 70 at low points on the bars 69.

A hay handling machine of the type herein shown serves not only to collect the hay in windrows but also turns the hay in such a way that the use of the ordinary hay tedder is unnecessary. The machine provided by my invention lifts the hay away from the ground and dust and carries it ten or fifteen feet through the air and drops it bottom side up on the ground which, by having been previously raked and exposed to the sun, is heated and dried sufficiently to cure the hay in the shortest time possible. The machine is preferably designed to take two swaths of the mowing machine and it picks them up as a continuous sheet and passes the hay to the delivery point without any pulling or breaking. By reversing the direction of the carrier, which the driver can do at will, the hay can be delivered in continuous windrows at either side of the machine. By starting and stopping the cross carrier while the gathering parts are in action, the hay can be delivered in bunches of any size desired, and at either side of the machine. The elastic mounting of the fingers on both the impaling and gathering cylinders permits the machine to operate effectively and satisfactorily, without danger of injury, on very rough ground.

In an earlier machine invented by me the main frame has been supported upon two transversely opposite wheels near the rear and a single wheel near the front, and the operative parts have been located between these two rear wheels and the front wheel. I have found, however, that there are many objections to mechanisms supported in this way upon three or more wheels. The principal objection arising from the difficulty experienced in steering and in making sharp turns.

By my present invention I have retained all of the advantages incident to the arrangement of parts present in my earlier machine but have so combined these parts with the main transversely opposite ground wheels that these ground wheels carry substantially the entire weight, thus making it possible for the third or forward wheel to be eliminated and the forward end of the frame carried by the tongue.

According to my present invention the hay is gathered or picked up at points at one side (preferably behind) of the axis of the wheels and is then carried upward and over the axis to points on the other side (preferably in advance) of the axis of the wheels from which it is carried transversely and discharged at the side. The arrangement is such that the weight of the mechanism behind the wheels together with that of the hay being elevated and of the driver substantially balances the weight of the mechanism in front of the wheels and the hay being carried forward and laterally. As a result, there is but little weight to be carried by the horses.

By my present invention I believe myself to be the first to provide in a hay handling machine three distinct cylinders arranged and operating in the way described. The impaling cylinder serves to engage and pick up the main body of hay and the gathering cylinder coöperates with the impaling cylinder to carry the hay upward and to prevent any stray wisps from remaining on the ground. The hay caught between the impaling and gathering cylinders is moved upward along the guiding bars 88 where it is caught by the elevating cylinder and carried farther upward to the point of discharge onto the forward conveyer.

What I claim is—

1. In a machine for handling hay, a rotating cylinder provided with hay impaling fingers and with a finger supporting and controlling mechanism within the said cylinder, comprising a support for the said fingers positioned eccentrically to normally cause them to protrude from the cylinder at one part of the revolution and to be retracted at another part of the revolution, and means for yieldably holding the said finger support in normal position, the said means serving to permit the fingers to yield inward when in protruded position, substantially as set forth.

2. In a machine for handling hay, a rotating cylinder having hay impaling fingers, and finger controlling mechanism within the cylinder, comprising a finger support positioned eccentrically to normally cause the fingers to protrude from the cylinder at one part of the revolution and to be retracted at another part of the revolution, the said finger support being positively connected with all of the fingers, thereby holding each of them against angular movement relative to the cylinder independently of the others, and a means for yieldably holding the finger support in normal position, the said means serving to permit the fingers to yield inward when in protruded position, substantially as set forth.

3. In a machine for handling hay, a rotating cylinder having hay impaling fingers, and a mechanism within the cylinder comprising an eccentrically positioned support with which the inner ends of all of the fingers are positively connected, and a yieldable means for holding the support in its normal position, the said mechanism serving to cause the finger to protrude at one part of the revolution and to be retracted at another part of the revolution and to permit them to yield inward when in protruded position, and the said mechanism also serving to hold the fingers against angular movement relative to the cylinder except as they move inward or outward, substantially as set forth.

4. In a machine for handling hay, a rotating cylinder having hay impaling fingers, an eccentrically positioned support within the cylinder connected with all of the fingers to normally cause them to protrude from the cylinder at the lower part of the revolution and to be retracted at the upper part of the revolution, and yieldable means for holding the said support in normal position, the said means serving to permit the fingers to move inward when in the lower part of the revolution, substantially as set forth.

5. In a machine for handling hay, a rotating cylinder having hay impaling fingers, an eccentrically positioned finger supporting device within the cylinder and positively connected with all of the fingers to normally cause them to protrude from the cylinder at the lower part of the revolution and to be retracted at the upper part of the revolution, the said supporting device also serving to hold the fingers against angular movement relative to the cylinder except as they move inward or outward, and means for yieldingly supporting the finger holding device in its normal position, the said means serving to permit inward yielding of the fingers when in the lower part of the revolution, substantially as set forth.

6. In a machine for handling hay, a rotating cylinder having hay impaling fingers, and a relatively movable device within the cylinder and connected with the inner ends of the fingers to guide them successively outward and inward radially as the cylinder rotates, thereby causing the fingers to protrude at one part of the revolution and to be retracted at another part of the revolution, resilient means for holding the said device in normal position, the said means serving to permit the fingers to yield inward when in protruded position and serving to return the fingers to their normal protruded position after yielding, substantially as set forth.

7. In a machine for handling hay, a rotating cylinder having hay impaling fingers, and a relatively movable device within the cylinder and connected with the inner ends of the fingers to guide them seccessively outward and inward radially as the cylinder rotates, thereby causing the fingers to protrude at one part of the revolution and to be retracted at another part of the revolution, resilient means for holding the said device in normal position, the said means serving to permit the fingers to yield inward when in protruded position and serving to return the fingers to their normal protruded position after yielding, all of the fingers being positively connected to the said device, whereby they are held against angular movement relative to the cylinder except as they move inward or outward, substantially as set forth.

8. In a machine for handling hay, a rotating cylinder having hay impaling fingers, a device within the cylinder for supporting the fingers, and means for holding the supporting device in an eccentric position to normally cause the fingers to extend outward at one part of the revolution farther than at another part, the said holding means being yieldable to allow movement of the finger supporting device to permit the fingers to yield inward when in their extended positions, substantially as set forth.

9. In a device for handling hay, a rotating impaling cylinder having an eccentrically located shaft and fingers adapted to protrude from the cylinder and having their inner ends mounted on the shaft, the shaft being adapted to move to permit some of the fingers to yield inward, substantially as set forth.

10. In a machine for handling hay, a rotating impaling cylinder having a shaft and fingers adapted to protrude from the cylinder and having their inner ends mounted on the shaft, the shaft being adapted to move to permit some of the fingers to yield inward, substantially as set forth.

11. In a hay handling machine, a rotating impaling cylinder having a shaft and fingers adapted to protrude from the cylinder and having their inner ends mounted on the shaft, the shaft being adapted to move to permit some of the fingers to yield inward, and the outer parts of the fingers being so supported as to prevent the movement of the fingers relative to the cylinder and independent of the shaft, substantially as set forth.

12. In a machine for handling hay, a rotating impaling cylinder having an eccentrically located shaft, and fingers adapted to protrude from the cylinder and having their inner ends mounted on the shaft, the shaft being mounted so as to be capable of movement about the axis of the cylinder to permit some of the fingers to yield inward, substantially as set forth.

13. In a machine for handling hay, a rotating impaling cylinder having an eccentrically located shaft, fingers adapted to protrude from the cylinder and having their inner ends mounted on the shaft, the shaft being mounted so that it will move to permit some of the fingers to yield inward, and means for automatically returning the shaft to its normal position, substantially as set forth.

14. In a machine for handling hay, a rotating impaling cylinder having an eccentrically located shaft and fingers adapted to protrude from the cylinder and having their inner ends mounted on the shaft, the shaft being so mounted that it will move in one direction to permit some of the fingers to yield inward, and means for limiting the movement of the shaft in the other direction, substantially as set forth.

15. In a machine for handling hay, a rotating impaling cylinder having an eccentrically located shaft, fingers adapted to protrude from the cylinder and having their inner ends mounted on the shaft, the shaft being so mounted that it will move in one direction to permit some of the fingers to yield inward, means for limiting the motion of the shaft in the other direction, and means for normally holding the shaft in and for returning it to its operative position, substantially as set forth.

16. In a machine for handling hay, a rotating impaling cylinder having a cranked shaft with its ends concentric with the axis of the cylinder, and fingers adapted to protrude from the cylinder and having their inner ends mounted on the eccentric portion of the shaft, the shaft being capable of rotation to permit some of the fingers to yield inward, substantially as set forth.

17. In a machine for handling hay, a rotating impaling cylinder having a cranked shaft, fingers adapted to protrude from the cylinder and having their inner ends mounted on the shaft, the shaft being capable of rotation to permit some of the fingers to yield inward, and means located at the end of the shaft to limit its rotation in one direction, substantially as set forth.

18. In a machine for handling hay, a rotating impaling cylinder having a cranked shaft, fingers adapted to protrude from the cylinder and having their inner ends mounted on the shaft, the shaft being capable of rotation to permit some of the fingers to yield inward, means located at the end of the shaft to limit its motion in one direction, and means for normally holding the shaft in and for returning it to its operative position, substantially as set forth.

19. In a machine for handling hay, a rotating impaling cylinder having an eccentrically located shaft, fingers adapted to protrude from the cylinder and arranged in a plurality of radial planes at intervals along the cylinder, and a plurality of members pivotally mounted on the shaft, all of the fingers in a single radial plane being connected at their inner ends to one of the said pivotally mounted members, substantially as set forth.

20. In a machine for handling hay, a rotating impaling cylinder having an eccentrically located shaft, fingers adapted to protrude from the cylinder in radial planes at intervals along its length, and a plurality of disks pivotally mounted on the shaft, all of the fingers in a single radial plane being pivotally connected to one of the disks, substantially as set forth.

21. In a machine for handling hay, a rotating impaling cylinder having an eccentrically located shaft, fingers adapted to protrude from the cylinders in radial planes at intervals along its length, a plurality of disks pivotally mounted on the shaft, all of the fingers in a single radial plane being pivotally connected to one of the disks, and means for maintaining the disks at proper intervals along the shaft, substantially as set forth.

22. In a machine for handling hay, a rotating impaling cylinder having an eccentrically located shaft, fingers adapted to protrude from the cylinder in radial planes at intervals along its length, a plurality of disks pivotally mounted on the shaft, all the fingers in a single radial plane being pivotally connected to one of the disks, and a spacing bar connected to the disks and adapted to maintain them at proper intervals along the shaft and to maintain them all in the same angular position, substantially as set forth.

23. In a machine for handling hay, a rotating impaling cylinder having an eccentrically located shaft, fingers adapted to protrude from the cylinder in a plurality of radial planes, a plurality of disks mounted on the shaft, the inner ends of the fingers in each radial plane being pivotally connected to one of the disks, and means for limiting the angular movement of the fingers relative to the disks, substantially as set forth.

24. In a machine for handling hay, a rotating impaling cylinder having an eccentrically located shaft, fingers adapted to protrude from the cylinder in a plurality of radial planes, and a plurality of disks mounted in pairs on the shaft, the inner ends of the fingers in each radial plane being pivotally mounted in one of the disks of each pair and the other disk of each pair serving to hold the fingers in engagement with the first disk, substantially as set forth.

25. In a machine for handling hay, the combination of an impaling cylinder having teeth adapted to protrude during the lower part of the revolution of the cylinder and to be retracted during the upper part of the revolution and to be capable of yielding inward when in their protruded position, and a gathering cylinder adapted to rotate in the opposite direction from the impaling cylinder and coöperate with it, the gathering cylinder being provided with teeth mounted to swing backward to permit them to be withdrawn from the hay, substantially as set forth.

26. In a machine for handling hay, the combination of a rotating impaling cylinder having non-resilient teeth adapted to protrude from the cylinder at the lower part of the revolution and to be retracted at the upper part of the revolution, the teeth being capable of yielding inward at the protruded position, and a gathering cylinder adapted to rotate in the opposite direction from the impaling cylinder and to coöperate with it, the gathering cylinder having teeth mounted to swing backward to permit them to be withdrawn from the hay, substantially as set forth.

27. In a machine for handling hay, the combination of a lower rotating impaling cylinder, a gathering cylinder adapted to rotate in the opposite direction from the impaling cylinder and to coöperate with it, and an upper elevating cylinder adapted to receive hay from the lower impaling cylinder and the gathering cylinder, substantially as set forth.

28. In a machine for handling hay, the combination of rotating lower and upper elevating cylinders, each of the cylinders having radial teeth mounted to be extended at one part of the revolution and to be withdrawn at another part, the operation of the teeth of the two cylinders being so related that, between the cylinders, the teeth of the lower will be withdrawn and those of the upper extended, substantially as set forth.

29. In a machine for handling hay, the combination of a lower rotating impaling cylinder, a gathering cylinder adapted to rotate in the opposite direction from the impaling cylinder and to coöperate with it, an upper elevating cylinder adapted to receive hay from the lower impaling cylinder and the gathering cylinder, and an endless conveyer passing around the upper elevating cylinder and adapted to receive hay therefrom, substantially as set forth.

30. In a machine for handling hay, the combination of a lower hay impaling cylinder, a gathering cylinder parallel to and immediately behind the impaling cylinder, means for rotating the two cylinders in opposite directions to elevate hay between them, an upper elevating cylinder adapted to receive hay from the said impaling cylinder and the said gathering cylinder, and a plurality of upward extending guiding and compression bars arranged in close proximity to the impaling and elevating cylinders, substantially as set forth.

31. In a machine for handling hay, the combination of a rotating lower elevating cylinder, a rotating upper elevating cylinder, each of the cylinders having radial teeth mounted to be extended at one part of the revolution and to be withdrawn at another part of the revolution, the operation of the teeth on the two cylinders being so related that, between the cylinders, the teeth of the lower will be withdrawn and those of the upper extended, and a plurality of upward extending guiding and compression bars in close proximity to the cylinders, substantially as set forth.

32. In a machine for handling hay, the combination of a rotating lower elevating cylinder, and a plurality of upward extending guiding or compression bars pivotally mounted at their lower ends and elastically supported to be capable of swinging toward or away from the cylinder, the upper part of the bars being flexible and extending above the points of elastic support, substantially as set forth.

33. In a machine for handling hay, the combination of two drive wheels each having an outward extending hub portion, a main frame mounted on the outward extending hub portion, a hay engaging cylinder having trunnions journaled in the hubs of the driving wheels, and ratchet devices connected to the inner parts of the hubs whereby the wheels when rotating in one direction will automatically engage the cylinder to rotate it and will be automatically disengaged when rotating in the opposite direction, substantially as set forth.

34. In a machine for handling hay, the combination of two drive wheels each having an outward extending hub portion, a main frame mounted on the outward extending hub portion, a hay engaging cylinder having trunnions journaled in the hubs of the driving wheels, ratchet devices whereby the wheels when rotating in one direction will automatically engage the cylinder to rotate it and will be automatically disengaged when rotating in the opposite direction, hay handling mechanism additional to the said cylinder, and power transmitting devices between the outer ends of the trunnions and the said hay handling mechanism, substantially as set forth.

35. In a hay handling machine, the combination of supporting and driving wheels having outward projections on their hubs, a main frame journaled on the said hub projections, a hay engaging cylinder having hollow trunnions, substantially as set forth. hubs, and a shaft rotatably mounted in the hollow trunnions, substantially as set forth.

36. In a hay handling machine, the combination of supporting and driving wheels having outward projections on their hubs, a main frame journaled on the said hub projections, a hay engaging cylinder having hollow trunnions journaled in the wheel hubs, a rotatable shaft mounted in the hollow trunnions, and means connected with the main frame and with the rotatable shaft for regulating the position of the shaft, substantially as set forth.

37. In a hay handling machine, the combination of supporting and driving wheels having outward projections on their hubs, a main frame journaled on the said hub projections, a hay engaging cylinder having hollow trunnions journaled in the wheel hubs, a shaft rotatably mounted in the hollow trunnions and devices connected with the frame and with the outer ends of the rotatable shaft for regulating the position of the shaft, substantially as set forth.

38. In a machine for handling hay, a rotating cylinder adapted to impale hay lying upon the ground, a shaft for said cylinder located below and to the rear of the axis of rotation of said cylinder, and fingers adapted to protrude from the cylinder and having their inner ends mounted on the shaft, the shaft being adapted to move to permit the fingers in the lower part of the cylinder to yield inward, substantially as set forth.

39. In a machine for handling hay, a rotating impaling cylinder, a cranked shaft for said cylinder having its cranked portion to the rear of the cylinder axis, and impaling fingers mounted at their inner ends on the said shaft and supported near their outer ends, so that they will be inclined forward at an angle to a radius of the cylinder when in the lower part of the revolution, the shaft being capable of partial rotation to permit the fingers to move longitudinally inward when in their lower position, substantially as set forth.

40. In a machine for handling hay, a rotating impaling cylinder, a cranked shaft for said cylinder having its cranked portion to the rear of the cylinder axis, and impaling fingers mounted at their inner ends on the said shaft and supported near their outer ends, so that they will be inclined forward at an angle to a radius of the cylinder when in the lower part of the revolution, the shaft being capable of partial rotation in one direction to permit the fingers in the lower part of the revolution to move longitudinally inward and incapable of rotation in the other direction, substantially as set forth.

41. In a hay handling machine, the combination of a frame, two supporting and driving wheels, mechanism for gathering and elevating hay from the ground, a conveyer adapted to receive hay from the said gathering and elevating mechanism and to carry it forward, and a cross conveyer adapted to receive hay from the before named conveyer and to deliver it at one side or the other of the machine in advance of the gathering and elevating mechanism, substantially as set forth.

42. In a machine for handling hay, the combination of a frame adapted to be supported at one end by the draft horses, wheels for supporting the rear end of the frame, hay gathering and elevating mechanism at the rear end of the machine, a conveyer adapted to receive hay from the said gathering and elevating mechanism and carry it forward, and a transverse conveyer adapted to receive hay from the before named conveyer and to deliver it at one side or the other of the machine at points in advance of the gathering and elevating mechanism, substantially as set forth.

43. In a machine for handling hay, the combination of a lower rotating impaling cylinder, an adjacent and parallel gathering cylinder adapted to rotate in the opposite direction from the impaling cylinder and to coöperate with it, an upward extending moving elevating means arranged to receive hay from the impaling and gathering cylinders to lift it, and a plurality of continuous unitary bars pivotally mounted co-axially with the gathering cylinder and bent concentrically therewith at their lower ends, the said bars being adapted to swing at their upper ends toward or away from the said elevating means, substantially as set forth.

44. In a machine for handling hay, the combination of a lower rotating impaling cylinder, an adjacent and parallel gathering cylinder adapted to rotate in the opposite direction from the impaling cylinder and to coöperate therewith, an upward extending moving elevating means arranged for receiving hay from the said impaling and gathering cylinders, and a series of single unitary bars located to serve at their lower ends as strippers for the gathering cylinders and at their upper ends as guiding means to coöperate with the said elevating means, substantially as set forth.

45. In a machine for handling hay, the combination of a rotating gathering cylinder, devices adapted to coöperate with the gathering cylinder to elevate hay therefrom, and a series of unitary bars pivotally mounted concentrically with the gathering cylinder, the lower part of the bars being positioned to serve as strippers for the gathering cylinder, and the upper parts of the bars being positioned to serve as hay guiding means in coöperation with the said elevating devices, substantially as set forth.

46. In a machine for handling hay, the combination of a main frame, a tongue rigidly connected to the forward end of the frame, two transversely opposite supporting wheels about the axis of which the entire machine can swing under the control of the tongue, mechanism for picking up hay at one side of the axis of the supporting wheels, mechanism for conveying the hay from the said pick-up mechanism to the other side of the axis of the supporting wheels, other mechanism supplemental to the aforesaid conveying mechanism and located on the said other side of the axis of the supporting wheels for conveying the hay to one side of the machine, and means for driving the last said conveying mechanism in either direction at the will of the operator to convey the hay to either side of the machine, substantially as set forth.

47. In a machine for handling hay, the combination of a main frame, wheels for supporting the frame, a rotating impaling cylinder, a gathering cylinder behind the impaling cylinder and adapted to coöperate therewith, upward and forward extending bars for engaging and guiding hay lifted by the said cylinders, an elevating cylinder above the impaling cylinder and arranged to coöperate with the said bars to move the hay upward, and a means for receiving hay from the bars and from the elevating cylinder and conveying it in a forward direction, substantially as set forth.

48. In a machine for handling hay, the combination of a main frame, a tongue rigidly connected to the forward end of the frame, two transversely opposite supporting wheels about the axis of which the entire machine can swing under the control of the tongue, mechanism positioned to pick up hay at a line behind the said supporting wheels, and mechanism positioned to receive the hay from the said pick-up mechanism and carry it to a point of delivery at one side of the machine and in advance of the said supporting wheels, substantially as set forth.

49. In a machine for handling hay, the combination of a main frame, a tongue rigidly connected to the forward end of the frame, two transversely opposite supporting wheels about the axis of which the entire machine can swing under the control of the tongue, mechanism for picking up hay at a line behind the supporting wheels, means for elevating the hay from the pick-up mechanism, a conveying device positioned to receive hay from the elevating mechanism and carry it forward, and a second conveying device positioned to receive hay from the first conveying device and carry it transversely to a point of delivery at one side of the machine and in advance of the said supporting wheels, substantially as set forth.

50. In a machine for handling hay, the combination of a main frame, two supporting wheels therefor, mechanism for picking up hay at one side of the axis of the supporting wheels, means for conveying the hay from the said pick-up mechanism to the other side of the axis of the supporting wheels, and mechanism located on the other side of the axis of the supporting wheels for conveying the hay to one side of the machine, substantially as set forth.

51. In a machine for handling hay, the combination of a main frame, a tongue rigidly connected to the forward end of the tongue, two transversely opposite supporting wheels about the axis of which the entire machine can swing under the control of the tongue, mechanism for picking up hay at one side of the axis of the supporting wheels, and mechanism for receiving the hay from the pick-up mechanism and carrying it to a point of delivery at one side of the machine and on the other side of the axis of the supporting wheels, substantially as set forth.

52. In a machine for handling hay, the combination of a main frame, wheels for supporting the frame, an impaling cylinder rotating in the same direction as the wheels and having protruding teeth which reciprocate radially as the cylinder rotates, the maximum protrusion being during the lower rear quarter of the revolution, a gathering cylinder immediately behind the impaling cylinder and rotating in the opposite direction to coöperate therewith to form a double pick-up, upward extending bars for engaging and guiding hay lifted by the said cylinders, and means coöperating with the said bars to move the hay upward, substantially as set forth.

53. In a machine for handling hay, the combination of a main frame, wheels for supporting the frame, an impaling cylinder rotating in the same direction as the wheels and having protruding teeth which reciprocate radially as the cylinder rotates, the maximum protrusion being during the lower rear quarter of the revolution, a gathering cylinder immediately behind the impaling cylinder and rotating in the opposite direction to coöperate therewith to form a double pick-up, upward extending bars for engaging and guiding hay lifted by the said cylinders, and elevating cylinder above the impaling cylinder and arranged to coöperate with the said bars to move the hay upward, and a means for receiving hay from the bars and from the elevating cylinder and conveying it in a forward direction, substantially as set forth.

54. In a machine for handling hay, the combination of a main frame, wheels for supporting the frame, an impaling cylinder rotating in the same direction as the wheels and having protruding teeth which reciprocate radially as the cylinder rotates, the maximum protrusion being during the lower rear quarter of the revolutions, a gathering cylinder immediately behind the impaling cylinder and rotating in the opposite direction to coöperate therewith to form a double pick-up, upward extending bars for engaging and guiding hay lifted by the said cylinders, an elevating cylinder above the impaling cylinder and rotating in the opposite direction, the said cylinder having protruding teeth which reciprocate radially as the cylinder rotates, the maximum protrusion being during the rear half of the revolution, and a means for receiving hay from the bars and from the elevating cylinder and conveying it in a forward direction, substantially as set forth.

55. The combination of a transverse carrier, two ground wheels, a carrier supporting frame vibratable on the ground wheels, a gathering cylinder supported resiliently on the said frame behind the ground wheels and having resilient ground-contacting fingers, reciprocating and rotating elevator fingers in front of the gathering cylinder and co-acting therewith to initiate the upward movement of hay, and means above said fingers for elevating the hay and carrying it longitudinally to the transverse carrier, substantially as set forth.

In testimony whereof I affix my signature, in presence of two witnesses.

MARSHALL BECK.

Witnesses:
R. B. LOURIE,
G. W. CRAMPTON.